(12) United States Patent
Kasuya

(10) Patent No.: US 8,937,743 B1
(45) Date of Patent: Jan. 20, 2015

(54) PAPER SHEET PROCESSING APPARATUS AND PAPER SHEET PROCESSING METHOD

(75) Inventor: Tomohiko Kasuya, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 382 days.

(21) Appl. No.: 13/361,414

(22) Filed: Jan. 30, 2012

(51) Int. Cl.
*G06K 15/02* (2006.01)
*H04N 1/48* (2006.01)
*H04N 1/393* (2006.01)

(52) U.S. Cl.
CPC ............... *H04N 1/482* (2013.01); *H04N 1/3935* (2013.01); *H04N 1/484* (2013.01); *H04N 1/393* (2013.01)
USPC .......................................................... 358/1.2

(58) Field of Classification Search
CPC ..... H04N 1/393; H04N 1/3935; H04N 1/482; H04N 1/484
USPC .......................................................... 358/1.2
See application file for complete search history.

(56) References Cited

U.S. PATENT DOCUMENTS

| | | | |
|---|---|---|---|
| 4,888,812 A | 12/1989 | Dinan et al. | |
| 6,665,431 B2 | 12/2003 | Jones et al. | |
| 2005/0207634 A1 | 9/2005 | Jones et al. | |
| 2009/0016647 A1* | 1/2009 | Hamaguchi | 382/305 |
| 2010/0102234 A1* | 4/2010 | Hamasaki et al. | 250/341.7 |
| 2011/0129139 A1 | 6/2011 | Numata et al. | |

FOREIGN PATENT DOCUMENTS

| | | |
|---|---|---|
| JP | 10-154256 | 6/1998 |
| JP | 2007-148717 | 6/2007 |

* cited by examiner

*Primary Examiner* — Fred Guillermety
(74) *Attorney, Agent, or Firm* — Renner, Kenner, Greive, Bobak, Taylor & Weber

(57) ABSTRACT

A paper sheet processing apparatus includes a transport path for transporting paper sheets one at a time, a line sensor unit that includes a light source that irradiates the paper sheet being transported through the transport path with light and a line sensor that receives light reflected from the paper sheet and processes a signal representing the received light to generate pixel data, and a control unit that performs an image thinning process on the pixel data and almost simultaneously generates a first image data and a second image data having different resolutions.

11 Claims, 9 Drawing Sheets

FIG.9

| MEDIUM TYPE | RESOLUTION (dpi) | SETTINGS | |
|---|---|---|---|
| BANKNOTE (FOR RECOGNITION) | 16.6 × 16.0 | — | |
| BANKNOTE (SERIAL NUMBER) | 100 × 100 | ☑ SAVE | ☑ OUTPUT |
| CHECK | 200 × 200 | ☐ SAVE | ☑ OUTPUT |
| COUPON 1 | 100 × 150 | ☐ SAVE | ☐ OUTPUT |
| COUPON 2 | 120 × 120 | ☐ SAVE | ☐ OUTPUT |
| . | . | . | |
| . | . | . | |

PAPER SHEET PROCESSING APPARATUS AND PAPER SHEET PROCESSING METHOD

BACKGROUND OF THE INVENTION

1. Field of the Invention

The present invention relates to a paper sheet processing apparatus and a paper sheet processing method that can reproduce an image printed on a paper sheet, such as, a banknote, a check, marketable securities, and a coupon.

2. Description of the Related Art

Banknote processing apparatuses that perform recognition processes such as denomination recognition and authentification based on a banknote image generated by scanning a banknote are known in the art. These banknote processing apparatuses recognize the banknotes based on the banknote images, and perform tasks such as calculating a total amount and sorting the banknotes by denomination, etc.

Paper sheet processing apparatuses that can process checks in addition to the banknotes have come to be used in recent times. When the processing target is the banknotes, these paper sheet processing apparatuses perform the recognition processes, such as, denomination recognition and authentification, a counting process for determining denomination-wise number of banknotes and a total amount, a process for sorting and stacking banknotes according to the type of the banknotes, such as, denomination, and a process for reading out serial numbers printed on the banknotes. In contrast, when the processing target is the checks, the paper sheet processing apparatuses perform tasks such as a process for reading out information, such as, a check amount, and a process for generating and saving images of the checks. The image of the check can be used when a problem arises while processing the check or to reconfirm the contents of the check, such as, the amount or an account number.

Unlike in the case of the banknotes, when receiving from customers and processing the checks, marketable securities, and coupons, if the paper sheet image is stored and thereby the information printed on the paper sheet is preserved, the original paper sheet can either be returned to the customer or destroyed without safekeeping the original paper sheet. Hence, there is a demand for a paper sheet processing apparatus that can generate and archive the image of the paper sheet while recognizing the type of the paper sheet or reading out the information printed on the paper sheet.

Because a sensor is used in the conventional banknote processing apparatus to generate the banknote image that is used in the recognition process, this apparatus can also be used as the paper sheet processing apparatus also handling paper sheets other than banknotes. However, there is a difference in a degree of resolution required for the image to be used for the type recognition process and that required for the image to be used for post processing, such as, confirmation of the information relating to the paper sheet. Specifically, the image to be used for post processing from which the printed information has to be read out needs to be of a higher resolution compared to the image to be used for the type recognition process for which it is enough to extract a feature required for recognizing the type of the paper sheet.

To be able to generate images of different resolutions using the same sensor, one approach could be to first generate a high resolution image, and thereafter convert the high resolution image into a lower resolution image. However, there is a disadvantage in this approach that the process of converting the resolution of the image is time consuming.

The recognition process is performed by comparing features between the generated image of the paper sheet and a template image pre-installed for each paper sheet. If a high resolution image generated for post processing can be used for the recognition process at the same resolution, there will be no need to change the resolution of the image. However, to realize this, the current low-resolution template images will need to be generated in high resolution. Moreover, if the recognition process is customized for a low-resolution template image, the recognition process also would need to be altered to suit the high-resolution template image.

Hence, there is a requirement for a paper sheet processing apparatus that can generate a high resolution image required for the post processing while simultaneously generating a low resolution image required for the type recognition process as in the conventional apparatus.

SUMMARY OF THE INVENTION

According to an aspect of the present invention, a paper sheet processing apparatus includes a transport path for transporting paper sheets one at a time; a line sensor unit that includes a light source that irradiates the paper sheet being transported through the transport path with light, and a line sensor that receives light reflected from the paper sheet and processes a signal representing the received light to generate pixel data; and a control unit that almost simultaneously generates a first image data and a second image data having a different resolution from the first image data by performing an image thinning process on the pixel data.

According to another aspect of the present invention, a paper sheet processing method includes transporting paper sheets one at a time; irradiating the paper sheet with light, receiving light reflected from the paper sheet with a line sensor, and generating pixel data based on the received light at the line sensor; and generating a first image data and a second image data having a different resolution from the first image data almost simultaneously by performing an image thinning process on the pixel data.

According to still another aspect of the present invention, a paper sheet processing method includes transporting paper sheets one at a time; irradiating light of different wavelengths one by one on the paper sheet during one cycle, receiving light reflected from the paper sheet with a line sensor, and generating pixel data based on the received light at the line sensor; generating image data having different resolutions from pixel data corresponding to the different wavelengths among the pixel data; and generating image data having different resolutions by performing an image thinning process on pixel data corresponding to same wavelength among the pixel data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a drawing showing an example of a setup screen for setting a resolution and an output method of the image data according to the present invention.

DETAILED DESCRIPTION OF THE PREFERRED EMBODIMENTS

Exemplary embodiments of a paper sheet processing apparatus and a paper sheet processing method according to the present invention are explained in detail below with reference to the accompanying drawings. Although the paper sheet processing apparatus according to an embodiment of the present invention can process various types of paper sheets, such as, banknotes, checks, marketable securities, and coupons, in the following explanation, banknotes and checks have been cited as examples. In the following explanation both banknotes and checks are referred to collectively as "paper sheets".

Figure 1:
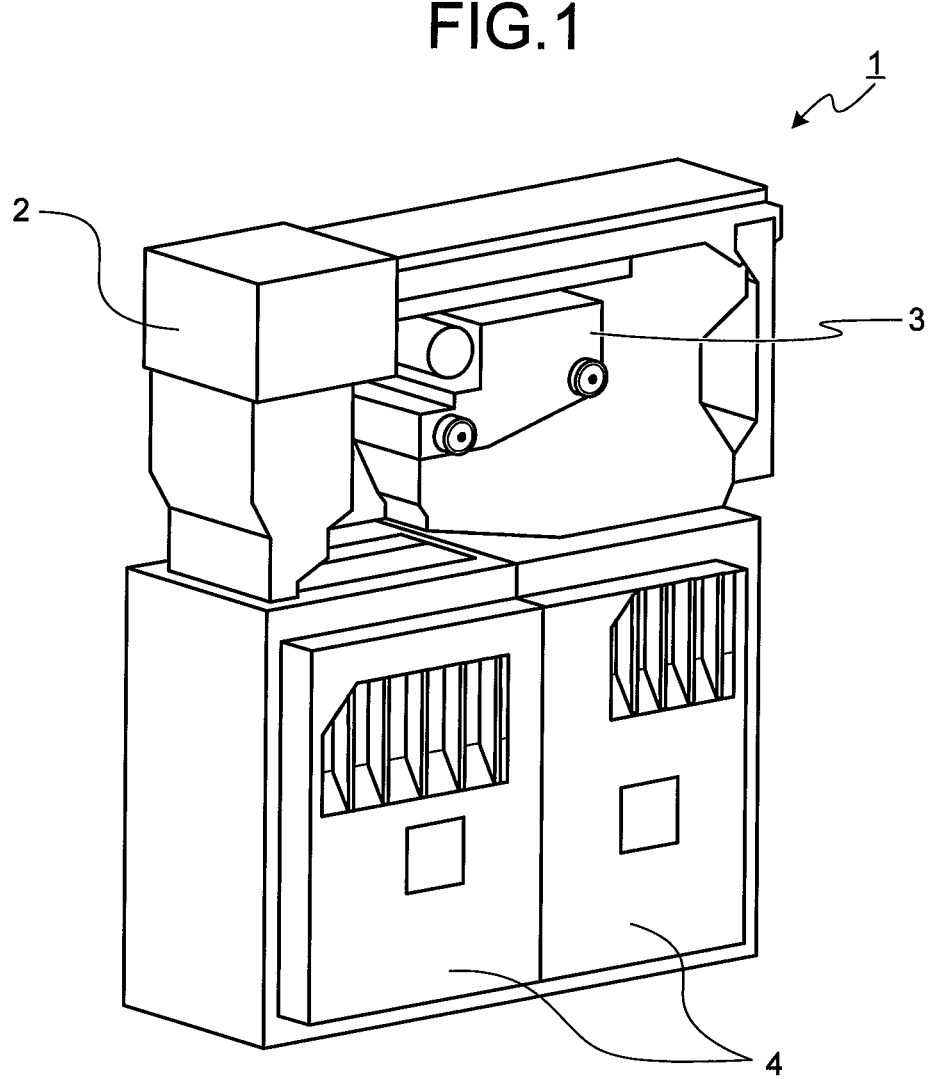
FIG. 1 is a perspective view of an outer appearance of a paper sheet processing apparatus according to an embodiment of the present invention.
Figure 2:
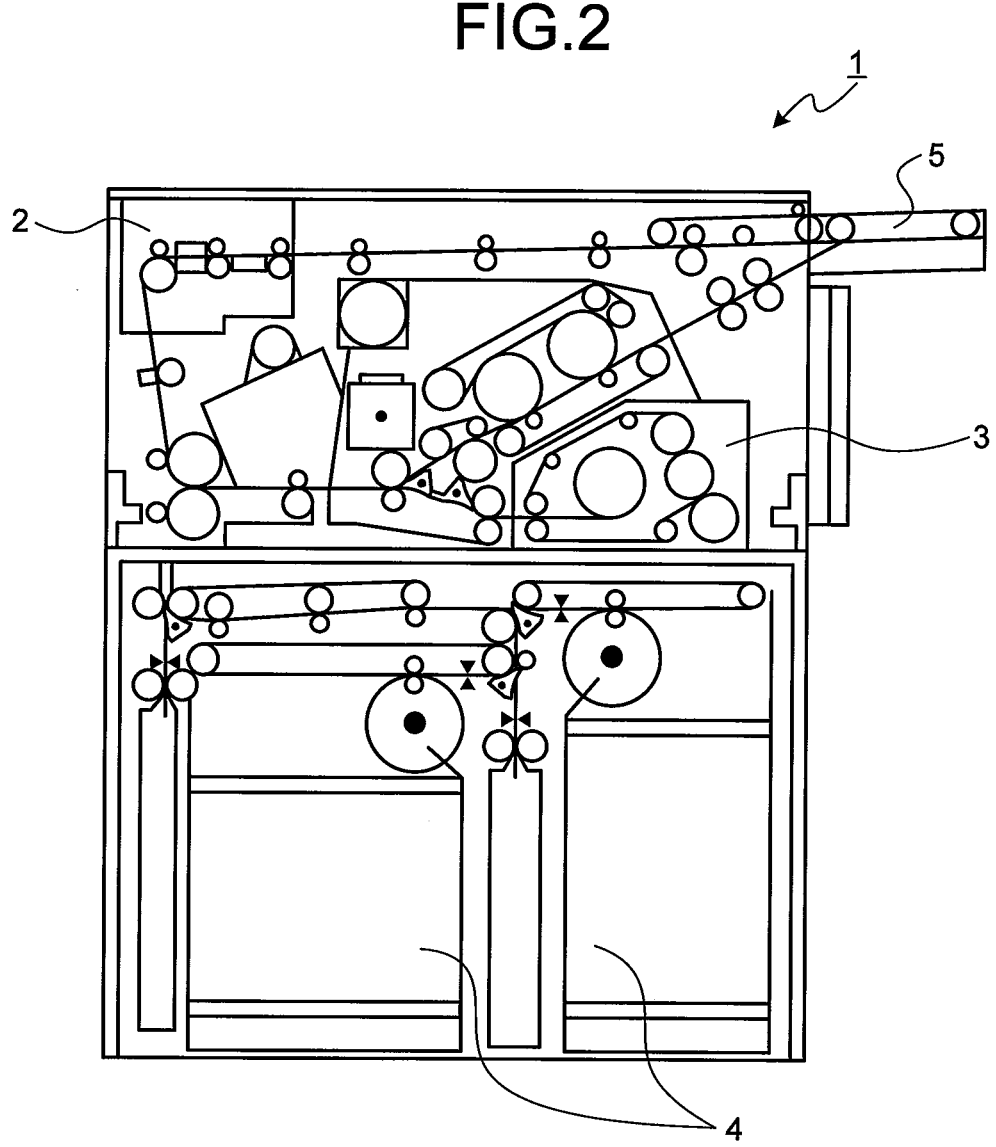
FIG. 2 is a cross-sectional schematic diagram of an internal structure of the paper sheet processing apparatus shown in FIG. 1.

FIG. 1 is a perspective view of an outer appearance of a paper sheet processing apparatus 1. FIG. 2 is a cross-sectional schematic diagram showing a structural overview of the paper sheet processing apparatus 1. The paper sheet processing apparatus 1 is used inside an ATM (Automated Teller Machine), etc. The paper sheet processing apparatus 1 includes a receiving slot 5 for receiving a paper sheet, a recognition unit 2 that recognizes a type of the paper sheet received through the receiving slot 5, an escrow unit 3 that temporarily escrows the paper sheet until a process for the recognized paper sheet is approved by a user, and a plurality of storage units 4 for sorting and stacking the paper sheets according to the type of the paper sheets.

Figure 3:
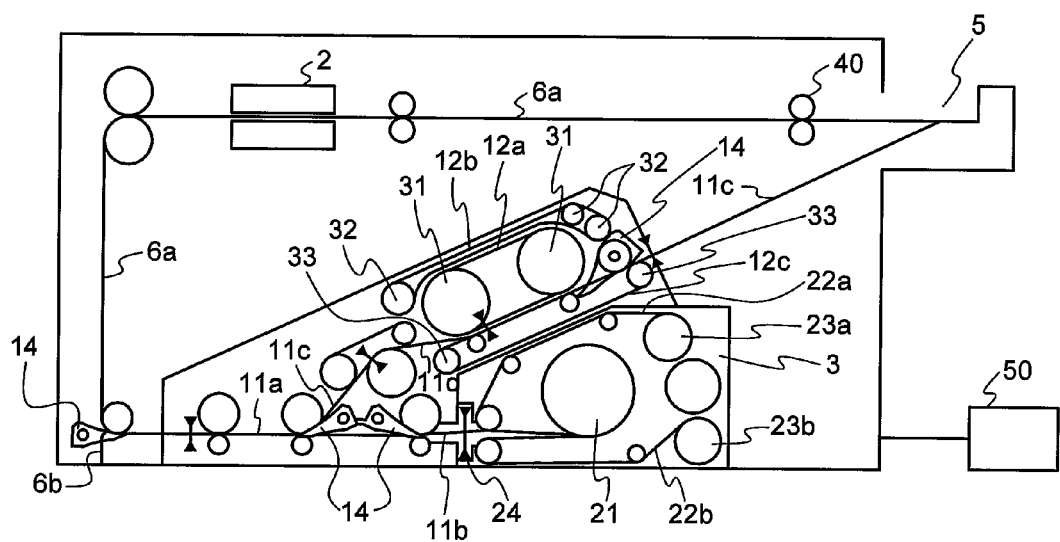
FIG. 3 is a cross-sectional schematic diagram of an upper portion of the paper sheet processing apparatus shown in FIG. 1.

FIG. 3 is a cross-sectional schematic diagram of an upper portion of the paper sheet processing apparatus 1 including the recognition unit 2 and the escrow unit 3. The paper sheet processing apparatus 1 is controlled by a control unit 50 of the ATM in which the paper sheet processing apparatus 1 is installed. The paper sheets received in the receiving slot 5 are fed inside a body of the apparatus one by one by a feeding unit 40, and then the paper sheets are transported through a transport path 6a. The recognition unit 2 recognizes whether the paper sheet being transported through the transport path 6a is to be a rejected paper sheet. A rejected paper sheet is a paper sheet, such as, a counterfeit note, a damaged paper sheet, or an unrecognizable paper sheet.

If the paper sheet is recognized to be a normal paper sheet, that is, not a rejected paper sheet, the paper sheet is transported to either a winding drum 21 or a winding drum 31 arranged inside the escrow unit 3 depending on the type of the paper sheet. For example, if the paper sheet is a banknote, it is transported through a transport path 1ib toward the winding drum 21, and if the paper sheet is a check, it is transported through a transport path 11c toward the winding drum 31. A diverting member 14 that is controlled by the control unit 50 is arranged at each diversion point on the transport path. The diverting member 14 controls the destination to which the paper sheet is to be transported.

If the paper sheet is a banknote, the banknote detected by a detection sensor 24 is wound on the winding drum 21 while being sandwiched between a pair of tapes 22a and 22b. In this way, a plurality of the banknotes is held on the winding drum 21, with each banknote wound thereon without any overlapping.

If the paper sheet is a check, the check detected by the detection sensor 24 is wound on the winding drum 31 while being sandwiched between a belt 12a wound over the winding drum 31 and a belt 12b wound over a roller 32 or a belt 12c wound over a roller 33. The checks are wound one on top of another, and in this way, a plurality of the checks that form a stack are held on the winding drum 31.

With the processing target paper sheets temporarily escrowed in the escrow unit 3, a result of recognition count by the recognition unit 2 is confirmed. Once it is confirmed that the result of the recognition count is problem-free, the banknotes escrowed in the escrow unit 3 are fed and transported to a corresponding one of the storage units 4 and stored therein.

When transporting the banknotes from the escrow unit 3 to the storage units 4, the control unit 50 rotates the winding drum 21 clockwise so that the banknotes are wound thereon in FIG. 3, and in conjunction with rotating winding roller 23a and 23b clockwise to wind the tapes 22a and 22b over them, respectively. Consequently, the banknotes wound over the winding drum 21 come unwound one by one and are released from the pair of the tapes 22a and 22b. The released banknotes are transferred from the escrow unit 3 to the transport path 11b. Thereafter, the banknotes are transported through a diverted path 6b toward the storage units 4 arranged in a lower portion of the paper sheet processing apparatus 1, and stored in the storage units 4.

The checks wound over the winding drum 21, as well as banknotes, can be fed and transported from the escrow unit 3 to the storage units 4 and stored therein or be transported as a bundle upward toward the right in FIG. 3 through the transport path 11c and returned to an operator via the receiving slot 5. Before returning the checks, a stamping unit not shown stamps on each of the checks information that indicates the check has been already processed.

Figure 4:
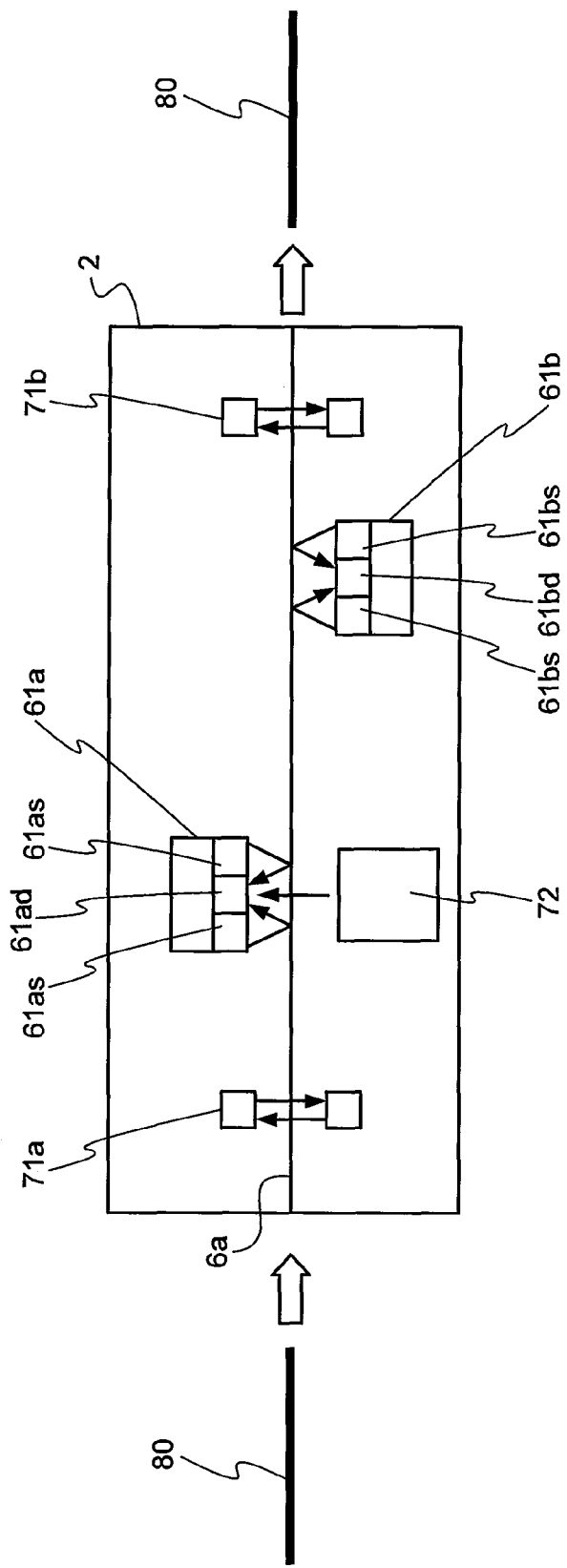
FIG. 4 is a cross-sectional schematic diagram of a recognition unit according to the present embodiment.

FIG. 4 is a cross-sectional schematic diagram of the recognition unit 2. The recognition unit 2 includes the transport path 6a, detection sensors 71a and 71b that detect an arrival of a paper sheet 80 to the transport path 6a and a transit of the paper sheet 80 through the transport path 6a, respectively, a first line sensor 61a that generates a reflection image on an upper surface of the paper sheet 80, a second line sensor 61b that generates a reflection image on a lower surface of the paper sheet 80, and a light source 72 that generates a transmission image of the paper sheet 80 using the first line sensor 61a. The upper surface of the paper sheet 80 being transported toward the transport path 6a from the left to the right as indicated by an arrow in FIG. 4 shall hereafter be referred to as a front surface and the lower surface as a back surface.

The first line sensor 61a includes light sources 61as that irradiate, toward the front surface of the paper sheet 80, red (R), green (G), blue (B), and infrared (IR) light in line form, and a sensor 61ad that receives reflected light from the front surface of the paper sheet 80. The light source 72, which is arranged facing the first line sensor 61a, also irradiates towards the back surface of the paper sheet 80 R, G, B, and IR light in line form. The light that passes through the paper sheet 80 is received by the sensor 61ad of the first line sensor 61a. In this manner, the reflection image of the front surface and the transmission image of the paper sheet 80 are generated using the first line sensor 61*a*.

Similarly, the second line sensor 61*b* includes light sources 61*bs* that irradiate R, G, B, and IR light toward the back surface of the paper sheet 80, in line form, and a sensor 61*bd* that receives reflected light from the back surface of the paper sheet 80. In this manner, the reflection image of the back surface of the paper sheet 80 is generated using the second line sensor 61*b*.

The recognition unit 2 performs a function of recognizing a type of the paper sheet 80 based on the reflection image of the front surface and the transmission image of the paper sheet 80 generated by the first line sensor 61*a* and the reflection image of the back surface of the paper sheet 80 generated by the second line sensor 61*b*. In FIG. 4, only functional units that are relevant to generation of image data are shown; however, according to the characteristics of the paper sheet 80, the recognition unit 2 can additionally include other sensors, such as, a sensor for security thread, a sensor for magnetic detection, and a thickness sensor that detects a thickness of the paper sheet 80. The recognition unit 2 recognizes the paper sheet 80 based on characteristics obtained from a paper sheet image, presence or absence of the security thread, magnetic characteristics, thickness, etc. of the paper sheet. A process for recognition of the type of the paper sheet 80 is similar to the conventional technique; hence a detailed explanation thereof is omitted.

In addition to generating the paper sheet image to be used in a recognition process, the recognition unit 2 also performs a function of generating a paper sheet image for use in a post processing. Post processing refers to a process of character recognition that involves recognition of a serial number, amount information, etc., printed on the paper sheet 80 as well as a process of visual confirmation of the paper sheet image by using the paper sheet image. For example, the control unit 50 in the paper sheet processing apparatus of the ATM can function as a serial number reading unit and read a serial number from the paper sheet image generated by the paper sheet processing apparatus 1.

The paper sheet image to be used for the recognition process to recognize the type of the paper sheet 80 is set to a degree of resolution necessary to extract the characteristics of the paper sheet 80. In contrast, the resolution of the paper sheet image to be used for the post processing, such as, character recognition of the characters printed on the paper sheet 80 and visual confirmation of the paper sheet 80 is set to a value that facilitates the characters to be read out. The resolution of the paper sheet image to be used for the post processing is generally set higher than that of the paper sheet image to be used for the recognition process. Specifically, for example, the resolution of the paper sheet image for the recognition process is set to several dozen dpi (dots per inch), whereas for the post processing it is set to several hundred dpi.

In this manner, a low-resolution paper sheet image and a high-resolution paper sheet image are almost simultaneously generated by the recognition unit 2. The low-resolution paper sheet image can be used for recognizing the type of the paper sheet 80, while the high-resolution paper sheet image can be outputted to the outside for post processing. Processes relating to the paper sheet image are explained in detail later.

The structure of the paper sheet processing apparatus 1 is not limited to the one described above. For example, a structure without the escrow unit 3 is also possible. Furthermore, the structure of the recognition unit 2 is not limited to the one described above. For example, an alternative structure in which only one line sensor is provided and no transmission image is generated is also possible.

Figure 5:
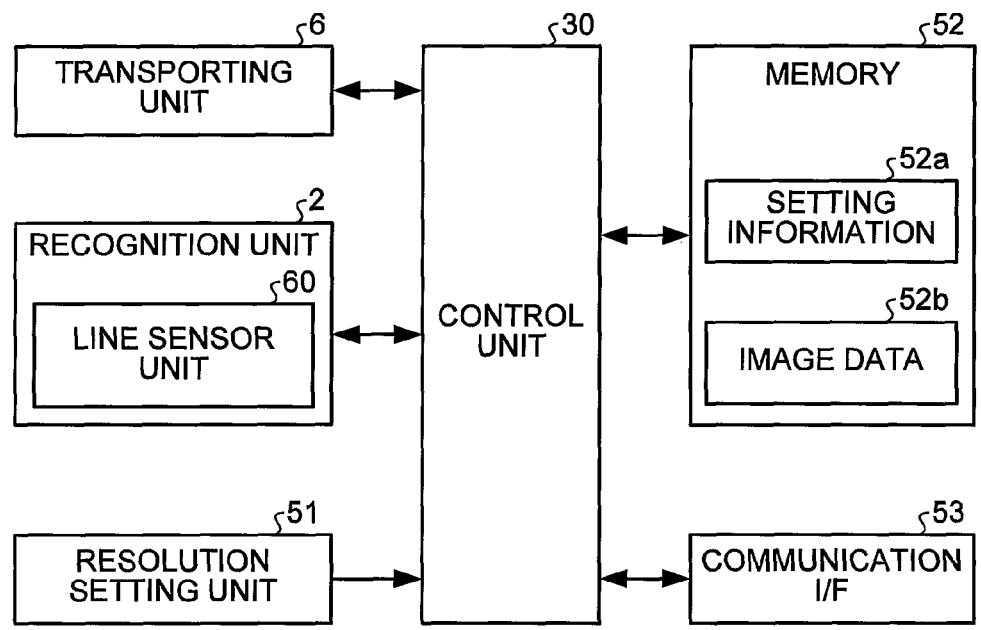
FIG. 5 is a functional block diagram of the paper sheet processing apparatus shown in FIG. 1.

FIG. 5 is a functional block diagram of the paper sheet processing apparatus 1. The paper sheet processing apparatus 1 includes a transporting unit 6 that transports the paper sheet, the recognition unit 2 that recognizes the type of the paper sheet being transported by the transporting unit 6, a resolution setting unit 51 that sets the resolution of the image to be generated by the recognition unit 2, a memory 52 that stores therein setting information 52*a* relating to the image to be generated, generated image data 52*b*, etc., a communication interface (I/F) 53 that is used for data communication between the paper sheet processing apparatus 1 and a not shown external device, and a control unit 30 that controls each of the parts mentioned above.

The recognition unit 2 includes a line sensor unit 60, which includes the first line sensor 61*a* and the second line sensor 61*b* shown in FIG. 4. In the present embodiment, only the functional units relevant to image data generation are shown; however, the recognition unit 2 may include the magnetic sensor and the thickness sensor in addition to the line sensor unit 60.

The resolution setting unit 51 performs the function of setting the resolution of the images to be generated by the first line sensor 61*a* and the second line sensor 61*b* included in the line sensor unit 60. Specifically, for example, an operation panel of the paper sheet processing apparatus 1 can function as the resolution setting unit 51, and can be used to set two types of resolutions for the images to be generated by the line sensor unit 60. The setting values are stored as the setting information 52*a* in the memory 52.

Instead of setting the resolution with the resolution setting unit 51 of the paper sheet processing apparatus 1, the resolution settings can be received from the external apparatus via the communication I/F 53.

The control unit 30 performs a process of storing the setting information 52*a* set by the resolution setting unit 51 in the memory 52. The control unit 30 further performs an on-off control over the light sources 61*as* and 61*bs* of the first line sensor 61*a* and the second line sensor 61*b*, and the light source 72 used for generating the transmission image by the first line sensor 61*a*. Furthermore, the recognition unit 2 generates the image data 52*b* from pixel data outputted by the line sensor unit 60 and stores the image data 52*b* in the memory 52.

Figure 6:
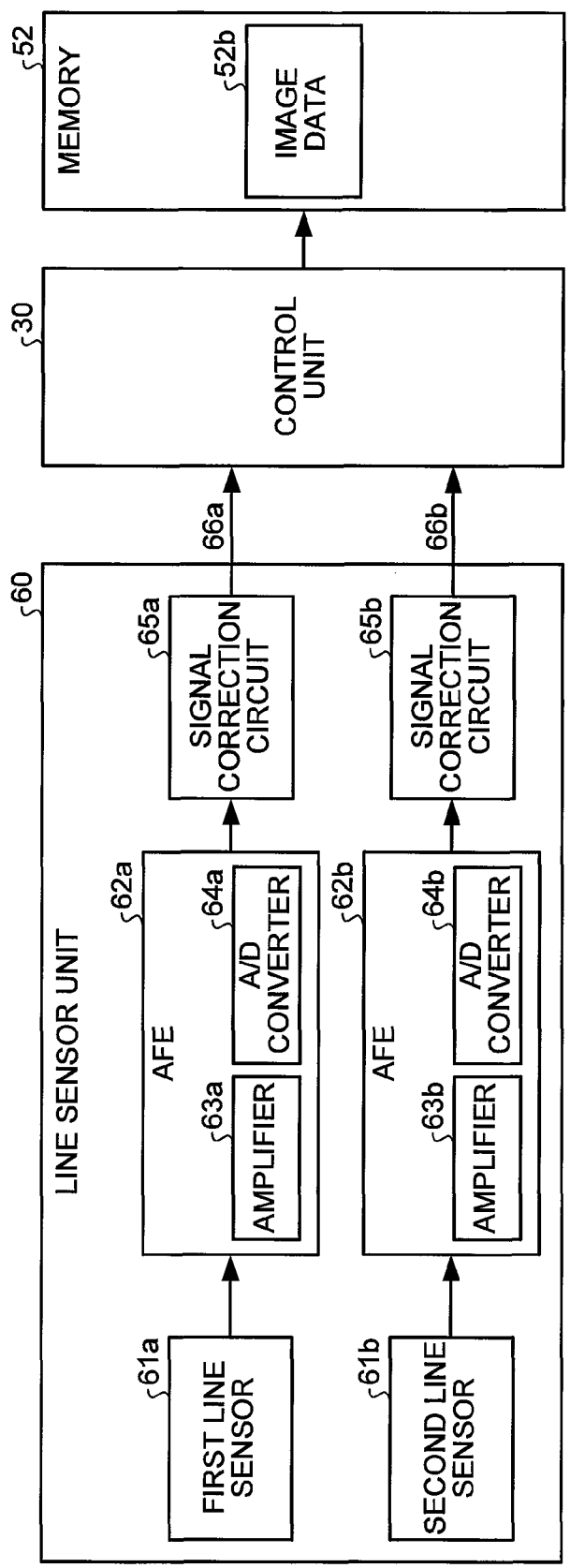
FIG. 6 is a functional block diagram of a line sensor unit according to the present embodiment.

The functional units relating to the image data generation are explained below. FIG. 6 is a block diagram of the line sensor unit 60, the control unit 30, and the memory 52 that generate the image data 52*b* using the data outputted from the line sensor unit 60. A plurality of the paper sheet images can be almost simultaneously and concurrently generated by these functional units.

The line sensor unit 60 includes the first line sensor 61*a* and the second line sensor 61*b* shown in FIG. 4, a first AFE (Analog Front End) circuit 62*a* and a second AFE circuit 62*b* that perform conversion of signals outputted from the first line sensor 61*a* and the second line sensor 61*b*, respectively, and a first signal correction circuit 65*a* and a second signal correction circuit 65*b* that perform correction processes of converted signals. That is, the line sensor unit 60 includes two systems of signal processing circuits, that is, one that includes the first AFE circuit 62*a* and the first signal correction circuit 65*a* for generating the reflection image and the transmission image of the front surface of the paper sheet, and the other that includes the second AFE circuit 62*b* and the second signal correction circuit 65*b* for generating the reflection image of the back surface of the paper sheet. The first AFE circuit 62*a* and the first signal correction circuit 65*a*, and the second AFE circuit 62*b* and the second signal correction circuit 65*b* operate independently, and therefore, can almost simultaneously and concurrently generate images of the front surface and the back surface of the paper sheet.

Pixel data 66a and 66b outputted from the line sensor unit 60 are inputted into the control unit 30. The control unit 30 generates the image data 52b by using all of the pixel data 66a (66b) outputted from the line sensor unit 60 and stores the image data in the memory 52. The control unit 30 also performs a function of generating an image data of a different resolution by a thinning process of the pixel data 66a (66b) outputted from the line sensor unit 60. The process of generating the image data from the pixel data 66a and 66b is explained in detail later.

The first AFE circuit 62a includes an amplifier 63a that amplifies the signal outputted from the first line sensor 61a and an A/D converter 64a that performs an A/D conversion of the amplified signal. The second AFE circuit 62b similarly includes an amplifier 63b that amplifies the signal outputted from the second line sensor 61b and an A/D converter 64b that performs an A/D conversion of the amplified signal.

The signal correction circuits 65a and 65b correct the signals outputted from the sensors and A/D converted pixel by pixel. Specifically, the signal correction circuits 65a and 65b perform corrections, such as, black correction, white correction, PGA (Programmable Gain Amplifier) correction, black offset addition, and bit conversion.

Black correction, white correction, and PGA correction are correction processes performed for correcting variations of the signals of respective pixels caused by sensor characteristics. The black correction process is a correction process by which a signal output level for each pixel is adjusted to a given value based on a sensor output value when no light is inputted. Whether the black correction process is to be performed is set based on the sensor characteristics. The white correction process is a correction process by which the signal output level for each pixel is adjusted to a given value based on the sensor output value when white color of a sheet is read under the light source. Whether the white correction process is to be performed is set based on the sensor characteristics and the light source. The PGA correction process is a correction process by which inter-pixel dynamic range is adjusted to a given value by adjusting a gain for each pixel. Whether the PGA correction process is to be performed is set based on the light source.

The black offset addition process is a process of correction by which, based on the sensor output value when the light source used for scanning is switched off, the signal output value of each pixel is adjusted so as not to be a negative value. Whether the black offset addition process is to be performed is set based on the sensor characteristics. The bit conversion process is a process performed for matching bit resolution of the signal output from the sensor with bit resolution of the image data to be generated. For example, while generating an 8-bit image data, if the signal outputted from the sensor is a 20-bit signal, the bit depth of the signal is changed to 8 bits.

Signals obtained by capturing the image of the paper sheet under a predetermined light source by the first line sensor 61a and the second line sensor 61b are processed independently. The signals are amplified pixel by pixel and converted to digital signals, and thereafter subjected to the signal correction process that is required according to the sensor characteristics and the light source. The resulting pixel data 66a and 66b of both sides of the paper sheet are outputted from the line sensor unit 60 to outside.

How the images of two different types of resolutions are generated is explained next. The paper sheet processing apparatus 1 generates images of different resolutions by exerting the on-off control over the light source while capturing the image and performing the thinning process of the pixel data after the image is captured.

Figure 7:
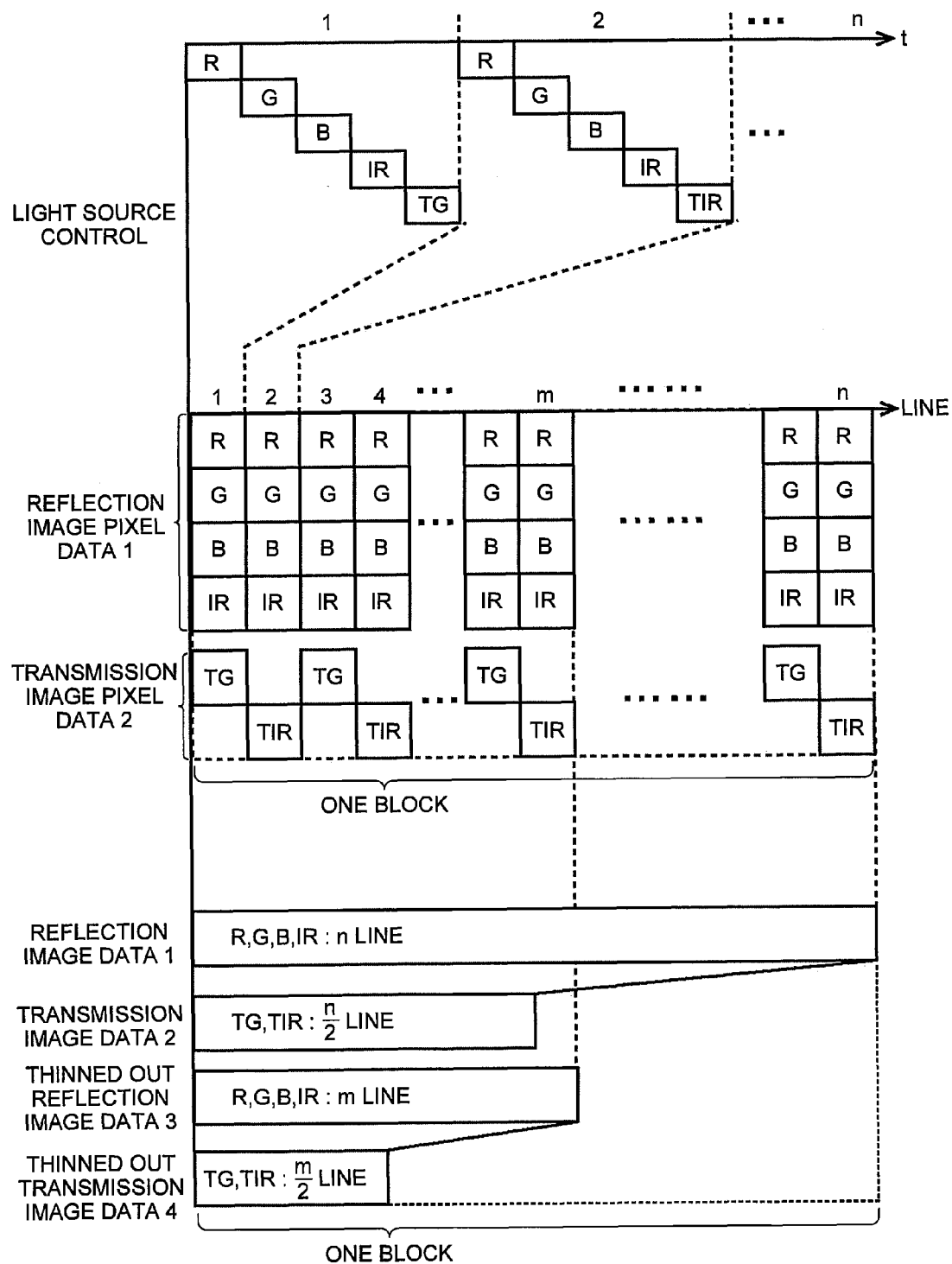
FIG. 7 is a drawing for explaining how a light source control is exerted and how a method of an image data creation is performed according to the present embodiment.

The on-off control of the light sources while capturing the image is explained first. FIG. 7 is a drawing showing a relation among the on-off control of the light sources, the pixel data output as a result of the on-off control of the light sources, and one block of the image data formed from the pixel data. The control unit 30 sequentially stores in the memory 52 the blocks of data obtained in this manner such that the image data 52b of the paper sheet is generated.

In FIG. 7, as an example, the light irradiated by the first line sensor 61a, namely, R, G, B, and IR light required for obtaining the reflection image, and green (TG), and infrared (TIR) light required for obtaining the transmission image are shown. The same process is performed by the second line sensor 61b except that it generates the transmission image. The horizontal axis in FIG. 7 represents time, and the numerals on the axis represent the line numbers of the pixel lines obtained by scanning the paper sheet one line at a time by the sensors.

As shown in the upper portion of FIG. 7, to obtain the image data of the first line, the control unit 30 controls the switching on and off of the light sources 61as and 72, and sequentially switches on light sources R, G, B, and IR required for obtaining the reflection image, and a light source TG required for obtaining the transmission image. By this on-off control of the light sources, as shown in the mid portion of FIG. 7, R pixel data, G pixel data, B pixel data, and IR pixel data that are the pixel data that form the reflection image, and TG pixel data that is the green pixel data that forms the transmission image, are obtained.

Next, the on-off control is exerted over the light sources 61as and 72 to obtain the pixel data of the second line. As a result, the R pixel data, the G pixel data, the B pixel data, and the IR pixel data that form the reflection image, and TIR pixel data, which is an infrared pixel data, that forms the transmission image, is obtained.

In the light source 61as for forming the reflection image, the light of each color (R, G, B, and IR) is sequentially switched on to obtain the pixel data for n number of lines. On the other hand, in the light source 72 for forming the transmission image, only the TG light source is switched on for odd numbered lines, and only a TIR light source is switched on for even numbered lines. By exertion of such an on-off control, the resolution of the transmission image in a sub scanning direction (transport direction) is reduced to half of the resolution of the reflection image. That is, as shown in the lower portion of FIG. 7, one block of reflection image data-1 formed of the pixel data of n lines, and one block of transmission image data-2 formed of the pixel data of half of n lines (n/2 lines) are generated.

The on-off control explained above is merely an example, and need not be thus limited. For example, control can be exerted to switch on the light source for forming the reflection image once for a plurality of lines, and to switch on the light source for forming the transmission image for all the lines. The on-off control of the light sources is performed according to the required resolution of the image captured by the light sources.

The image thinning process of the pixel data after the image is captured is explained next. The control unit 30 performs the image thinning process of the pixel data outputted from the line sensor unit 60 to generate images of different resolutions.

Specifically, as shown in the mid portion of FIG. 7, out of the n lines of pixel data obtained by exerting the on-off control of the light sources, image data of different resolutions are generated by using the pixel data of only the first m lines. In the example shown in FIG. 7, as shown in the lower portion of FIG. 7, two types of image data, namely, one block of reflection image data-3 formed of the pixel data of m lines, and one block of transmission image data-4 formed of the pixel data of half of m lines (m/2 lines), are generated.

The thinning process of the pixel data is a process by which the control unit 30 generates the image data 52b while thinning out the pixel data 66a and 66b outputted from the line sensor unit 60. For example, from the pixel data 66a of n lines obtained by exerting the on-off control, the image data including the entire pixel data 66a of n lines and the image data including the pixel data of only m lines obtained by the image thinning process are almost simultaneously and concurrently generated.

The image thinning process can be performed on only one or both of the pixel data 66a and 66b outputted concurrently from the line sensor unit 60. The number of the pixel data to be used after the image thinning process can be set using the resolution setting unit 51. For example, the pixel data of 12 lines can be set to represent one block, and the number of lines from which the pixel data is to be used can be set to be selectable from among 2, 4, 6, 8, and 10.

As a pixel data image thinning out method, in an instance where the pixel data of 4 lines are to be used from among the pixel data of 12 lines forming one block, only the pixel data of the first, fourth, eighth, and twelfth line can be used. In comparison, in an instance where the pixel data of the first line to the fourth line are used, there is no need to wait until the pixel data of the twelve lines has been obtained, and a processing time the image thinning process can be shortened. Therefore, when image thinning out the pixel data, it is preferable to use the pixel data of a set predetermined number of lines from the first line.

Thus, in the paper sheet processing apparatus 1, by exerting the on-off control of the light sources to be used in the first line sensor 61a and the second line sensor 61b for capturing the images, image data of different resolutions can be generated. Furthermore, by performing the image thinning process, image data of different resolutions can be generated from the image data obtained by exerting on-off control over the light source.

Figure 8:
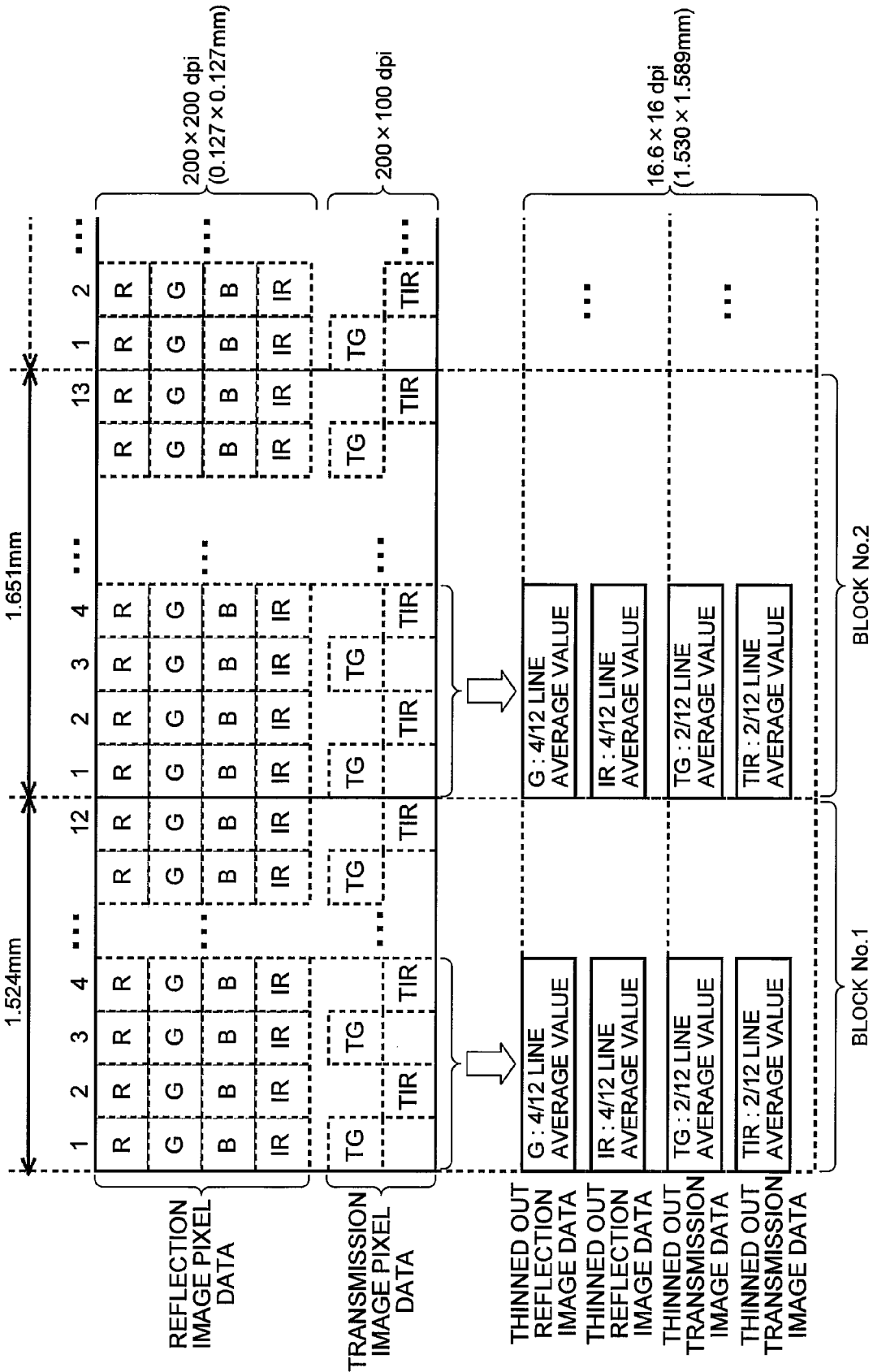
FIG. 8 is a drawing showing an example of the light source control and the image data creation according to the present embodiment.

How the image data is generated by the on-off control and the image thinning process is explained next with a concrete example. FIG. 8 is a drawing showing an example of how the high-resolution reflected and transmission images, and low-resolution reflected and transmission images are generated by exerting the on-off control explained with reference to FIG. 7. In the example shown in FIG. 8, the high-resolution reflection image of 200×200, the high-resolution transmission image of 200×100 dpi, the low-resolution reflection image of 16.6×16 dpi, and the low-resolution transmission image of 16.6×16 dpi are generated. The high resolution images are used for post processing such as the character recognition process and visual confirmation, while the low resolution images are used for the recognition process of recognizing the type of the paper sheet.

When the image of the paper sheet is scanned in a resolution of 200 dpi in the sub scanning direction by using the sensor that has a resolution of 200 dpi in a main scanning direction, the R pixel data, the G pixel data, the B pixel data, and the IR pixel data of the reflection image of 200×200 dpi can be obtained as shown in the upper portion of FIG. 8.

By performing the thinning process on the pixel data sequentially outputted from the sensor, the pixel data of only the first four lines can be used to generate the reflection image. For example, as shown in the lower portion of FIG. 8, only the pixel data of the first four lines out of the 12 lines of G pixel data can be used to form G pixel data of one block. Similarly, only the pixel data of the first four lines of the 12 lines of the IR pixel data can be used to form IR pixel data of one block.

During the image thinning process, 200 dpi pixel data of 200 lines in the sub scanning direction are divided into 16 block data to be processed in order to generate 16 dpi low-resolution pixel data from 200 dpi high-resolution pixel data. As shown in FIG. 8, there are two kinds of block data, one is the pixel data of 12 lines (1.524 millimeter (mm)) and the other block is the pixel data of 13 lines (1.651 mm), where one line is 0.127 mm. In other words, when two block data consisting of the block of 12 lines and the block of 13 lines are regarded as one set, 200 lines are divided into 8 sets. The reason for using two kinds of blocks is to avoid line number with a decimal point to get 16 dpi low-resolution pixel data. An average value is calculated from the first four lines of reflection image pixel data of each block, and each average value is regarded as one line data of each image data. Consequently, from the pixel data of 25 lines (two block data), the pixel data of 2 lines can be obtained by the image thinning process. That is, from the pixel data of 12.5 lines, the pixel data of one new line can be obtained by the image thinning process. Therefore, the image after the image thinning process has the resolution of 16 dpi (200 dpi/12.5) in the sub scanning direction. In the main scanning direction, 12 pixels of 200 dpi are gathered and the result of their average is handled for a new pixel, and the average value is regarded as the pixel data newly generated. Consequently, the image after the image thinning process has a resolution of 16.6 dpi (200 dpi/12) in the main scanning direction.

By processing the pixel data as described above, the reflection image data obtained without the image thinning process is the high-resolution image data having a resolution of 200× 200 dpi of which pixel area is 0.127×0.127 mm. On the other hand, the reflection image data on which the image thinning process has been performed is the low-resolution image data having a resolution of 16.6×16 dpi of which area is 1.530× 1.589 mm. Although lower portion of FIG. 8 shows thinned out reflection image data of G and IR pixel data, thinned out reflection image data of R and B pixel data can be generated by above mentioned process.

In the case of the transmission images, as a result of the on-off control exerted over the light source 72 for forming the transmission image shown in FIG. 7, the TG pixel data and the TIR pixel data of 200×100 dpi, that is, the transmission image data having half of the resolution of the reflection image, are obtained in the sub scanning direction (transport direction), as shown in FIG. 8. Similar to the reflection image, by performing the thinning process on the transmission images, thinned out TG pixel data and TIR pixel data are obtained. The pixel data of only the first two lines of each block are used in the case of the transmission image data. However, because the data are divided into blocks in a similar manner to that in the thinning process for the reflection image, the resolution of the thinned out transmission image remains the same as that of the thinned out reflection image at 16.6×16 dpi.

The signals from the front surface of the paper sheet scanned by the first line sensor 61a are processed as shown in FIG. 8 by the first AFE circuit 62a and the first signal correction circuit 65a shown in FIG. 6. Consequently, for example, a high-resolution reflection image of the front surface, a low-resolution transmission image of the paper sheet by exertion of control over the light source, and a low-resolution reflection image of the front surface by the image thinning process are generated. Concurrently, the signals from the back surface of the paper sheet captured by the second line sensor 61b are processed as shown in FIG. 8 by the second AFE circuit 62b and the second signal correction circuit 65b shown in FIG. 6. Consequently, for example, a high-resolution reflection image of the back surface and a low-resolution reflection image of the back surface of the paper sheet by exertion of control over the light source are generated.

As a result, the high-resolution face-side image and back-side image to be used in post processing, such as, character recognition and visual confirmation, the low resolution face-side image, back-side image, and the transmission image to be used in the recognition process for recognizing the type of the paper sheet are almost simultaneously and concurrently generated.

The image data thus generated can be stored as the image data 52b in the memory 52 inside the paper sheet processing apparatus 1 for later use or output to the external apparatus via the communication I/F 53. The resolution of the image data to be generated can be set by the resolution setting unit 51. The resolution set by using the resolution setting unit 51 is realized through the on-off control of the light sources and the thinning process of the pixel data.

FIG. 9 is a drawing showing an example of a setup screen for setting the resolution and an output method of the image data. The resolution of the image data to be generated can be set in this way for each type of the medium (paper sheet). Whether the generated image data is to be stored in the memory 52 of the paper sheet processing apparatus 1 or output to the outside can also be selected for each type of the medium.

In the example shown in FIG. 9, in the case where the paper sheet is a banknote, the resolution of the banknote image is set as 100×100 dpi for the purpose of reading a serial number, and both storing the mage to the memory 52 and outputting it to the outside options are selected for the banknote image. In the case where the paper sheet is a check, the resolution of the check image is set as 200×200 dpi, and an option, only output to the outside without saving the image to the memory 52, is selected As shown in FIG. 9, the setting of the resolution of the banknote image for the purpose of recognition can be changed as desired. This is so that if there is any change in the resolution of the template data used for the recognition process of the banknote, a banknote image can be generated in a resolution that is appropriate for comparing with the new template. Therefore, even if there is a change in the resolution of the template data in the future, the resolution of the paper sheet image generated by the paper sheet processing apparatus 1 can be easily changed to one that matches with the new template.

Thus, according to the present embodiment, by exerting the on-off control over the light sources while scanning the image of the paper sheet, and performing the image thinning process on the signals outputted from the sensors by which the images of the paper sheet are scanned, the images of different resolutions can be generated. Because these processes are performed independently and concurrently, the images of different resolutions can be generated almost simultaneously. Because the low-resolution paper sheet image used in the recognition process for recognizing the type of the paper sheet and the high-resolution paper sheet image used in post processing for character recognition, visual confirmation etc., are almost simultaneously generated, the processes can be completed in a short time compared to the case in which first the high resolution image is generated and then the low resolution image is generated.

Furthermore, because the resolution of the image to be generated can be set as desired, the resolution can be set according to the type of the paper sheet. Moreover, because setting of whether the generated image is to be stored in the paper sheet processing apparatus 1 or output to the outside can be done, this setting can be done as per user operation. Furthermore, even if there is a change in the resolution of the template data used in the recognition process of the paper sheet, the recognition process can be performed by generating the paper sheet image of a resolution that matches with the new template data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A paper sheet processing apparatus comprising:
   a transport path for transporting paper sheets one at a time;
   a line sensor unit that includes:
   a light source that irradiates the paper sheet being transported through the transport path with light, and
   a line sensor that receives light reflected from the paper sheet and processes a signal representing the received light to generate pixel data; and
   a control unit that generates a first image data and a at least one other image data having a different resolution from the first image data by performing an image thinning process on the pixel data,
   wherein one of the resolutions is set so that an image of the one resolution can be used to read characters on the paper sheet, and one of the other resolutions is set according to a resolution of a template image so that an image of the other one resolution can be used to perform a recognition process of the paper sheet with the template image.

2. The paper sheet processing apparatus according to claim 1, wherein the control unit performs the image thinning process by using a predetermined number of pixel data from among a plurality of the pixel data that form one block of data and are output from the line sensor unit.

3. The paper sheet processing apparatus according to claim 1, further comprising:
   a resolution setting unit for setting a resolution of image data to be generated according to a type of the paper sheet to be processed,
   wherein the control unit generates the first image data and the at least one other image data having resolutions set by the resolution setting unit.

4. The paper sheet processing apparatus according to claim 1, wherein the paper sheet includes a banknote and marketable securities other than the banknote.

5. The paper sheet processing apparatus according to claim 1, further comprising:
   a recognition unit that performs a recognition process for recognizing a type of the paper sheet by using an image data that is of a lower resolution between the first image data and the at least one other image data.

6. The paper sheet processing apparatus according to claim 1, further comprising:
   a serial number reading unit that performs a process of character recognition of a serial number of the paper sheet by using an image data that is of a higher resolution between the first image data and the at least one other image data.

7. The paper sheet processing apparatus according to claim 1, wherein
the line sensor unit includes a plurality of light sources for emitting light of different wavelengths, and
the control unit exerts an on-off control over each light source, and irradiates the paper sheet with light of different wavelengths by sequentially switching on and off each light source during one cycle and changes the light sources to be switched on during the one cycle thereby causing the line sensor unit to output pixel data that can be used to generate image data of a plurality of types of different resolutions.

8. The paper sheet processing apparatus according to claim 1, further comprising a memory for storing the first image data and the at least one other image data.

9. The paper sheet processing apparatus according to claim 1, further comprising a communication interface for performing data communication between the paper sheet processing apparatus and an external device.

10. A paper sheet processing method comprising:
transporting paper sheets one at a time;
irradiating the paper sheet with light, receiving light reflected from the paper sheet with a line sensor, and generating pixel data based on the received light at the line sensor; and
generating a first image data and at least one other image data having a different resolution from the first image data by performing an image thinning process on the pixel data,
wherein one of the resolutions is set so that an image of the one resolution can be used to read characters on the paper sheet, and one of the other resolutions is set according to a resolution of a template image so that an image of the other one resolution can be used to perform a recognition process of the paper sheet with the template image.

11. A paper sheet processing method comprising:
transporting paper sheets one at a time;
irradiating light of different wavelengths one by one on the paper sheet during one cycle, receiving light reflected from the paper sheet with a line sensor, and generating pixel data based on the received light of the different wavelengths at the line sensor;
generating image data having different resolutions from pixel data corresponding to the different wavelengths among the pixel data; and
generating image data having different resolutions by performing an image thinning process on pixel data corresponding to same wavelength among the pixel data,
wherein one of the resolutions is set so that an image of the one resolution can be used to read characters on the paper sheet, and one of the other resolutions is set according to a resolution of a template image so that an image of the other one resolution can be used to perform a recognition process of the paper sheet with the template image.

* * * * *